(12) United States Patent
Li et al.

(10) Patent No.: US 10,917,834 B2
(45) Date of Patent: Feb. 9, 2021

(54) METHOD FOR TRANSMITTING SYSTEM INFORMATION AND RELATED DEVICES

(71) Applicant: Yulong Computer Telecommunication Scientific (Shenzhen) Co., Ltd., Guangdong (CN)

(72) Inventors: Mingju Li, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 6 days.

(21) Appl. No.: 16/589,866

(22) Filed: Oct. 1, 2019

(65) Prior Publication Data

US 2020/0037231 A1    Jan. 30, 2020

Related U.S. Application Data

(63) Continuation of application No. PCT/CN2018/074152, filed on Jan. 25, 2018.

(30) Foreign Application Priority Data

May 5, 2017    (CN) .......................... 2017 1 0317490

(51) Int. Cl.
    *H04W 48/10*    (2009.01)
    *H04W 48/14*    (2009.01)
(52) U.S. Cl.
    CPC ............ *H04W 48/10* (2013.01); *H04W 48/14* (2013.01)

(58) Field of Classification Search
    None
    See application file for complete search history.

(56) References Cited

U.S. PATENT DOCUMENTS

| | | | |
|---|---|---|---|
| 2014/0293908 A1 | 10/2014 | Kumar et al. | |
| 2018/0270865 A1* | 9/2018 | Mallick | H04W 74/0833 |
| 2019/0159110 A1* | 5/2019 | Takahashi | H04W 48/10 |

FOREIGN PATENT DOCUMENTS

| | | |
|---|---|---|
| CN | 101400130 A | 4/2009 |
| CN | 101483903 A | 7/2009 |
| CN | 101640842 A | 2/2010 |
| CN | 103096262 A | 5/2013 |
| CN | 107040977 A | 8/2017 |

OTHER PUBLICATIONS

International search report issued in corresponding international application No. PCT/CN2018/074152 dated Mar. 29, 2018.

(Continued)

*Primary Examiner* — Hong S Cho

(57) ABSTRACT

A method for transmitting system information and related devices are provided. The method includes the following. A base station receives a system information request sent by a terminal. The base station sends the system information to the terminal according to the system information request. The system information includes minimum system information and other system information. The minimum system information includes a bitmap field for indicating a system information block existing in the other system information.

20 Claims, 3 Drawing Sheets

---

A BASE STATION RECEIVES A SYSTEM INFORMATION REQUEST SENT BY A TERMINAL — S201

THE BASE STATION SENDS THE SYSTEM INFORMATION TO THE TERMINAL ACCORDING TO THE SYSTEM INFORMATION REQUEST. THE SYSTEM INFORMATION INCLUDES MINIMUM SYSTEM INFORMATION AND OTHER SYSTEM INFORMATION, AND THE MINIMUM SYSTEM INFORMATION INCLUDES A BITMAP FIELD FOR INDICATING A SYSTEM INFORMATION BLOCK EXISTING IN THE OTHER SYSTEM INFORMATION — S202

(56) References Cited

OTHER PUBLICATIONS

Sony: "Scheduling information for on demand SI provided by broadcast", 3GPP Draft; R2-1703285 NR SI Scheduling, 3rd Generation Partnership Project (3GPP), Mobile Competence Centre; 650, Route Des Lucioles; F-06921 Sophia-Antipolis Cedex; France; vol. RAN WG2, No. Spokane, USA; Apr. 3, 2017-Apr. 7, 2017, Apr. 3, 2017, XP051245171, Retrieved from the Internet: URL:http://www.3gpp.org/ftp/Meetings_3GPP_SYNC/RAN2/Docs/ the whole document.

Samsung (email Rapporteur): "Report of email discussion: [95#29] [NR] On demand SI", 3GPP Draft; R2-166497 On Demand Si Email Discussion_Draftreport, 3rd Generation Partnership Project (3GPP), Mobile Competence Centre; 650, Route Des Lucioles; F-06921 Sophia-Antipolis Cedex; France; vol. RAN WG2, No. Kaohsiung, Taiwan; Oct. 10, 2016-Oct. 14, 2016, Oct. 9, 2016, XP051151013, Retrieved from the Internet: URL:http://www.3gpp.org/ftp/Meetings_3GPP_SYNC/RAN2/Docs/; [retrieved on Oct. 9, 2016]; p. 8, line 1-p. 10, line 8; table 3.

Zte et al: "Further discussion on Minimum SI", 3GPP Draft; R2-1700147, 3RD Generation Partnership Project (3GPP), Mobile Competence Centre; 650, Route Des Lucioles; F-06921 Sophia-Antipolis Cedex; France; vol. RAN WG2, No. Spokane, USA; Jan. 17, 2017-Jan. 19, 2017, Jan. 17, 2017, XP051210732, Retrieved from the Internet: URL:http://www.3gpp.org/ftp/Meetings_3GPP_SYNC/RAN2/Docs/ [retrieved on Jan. 17, 2017]; Section 2.

Mediatek Inc: "Discussion on remaining system information delivery", 3GPP Draft; R1-1704438 Discussion on Remaining System Information Delivery, 3rd Generation Partnership Project (3GPP), Mobile Competence Centre; 650, Route Des Lucioles; F-06921 Sophia-Antipolis Cedex, vol. RAN WG1, No. Spokane, USA; Apr. 3, 2017-Apr. 7, 2017, Apr. 2, 2017, XP051242585, Retrieved from the Internet: URL:http://www.3gpp.org/ftp/;meetings_3GPP_SYNC/RAN1/Docs/ [retrieved on Apr. 2, 2017]; Section 2.

Supplementary European Search Report issued in corresponding European application No. EP18793967 dated Jul. 29, 2020.

* cited by examiner

METHOD FOR TRANSMITTING SYSTEM INFORMATION AND RELATED DEVICES

CROSS-REFERENCE TO RELATED APPLICATION(S)

This application is a continuation of PCT Application No. PCT/CN2018/074152, filed on Jan. 25, 2018, which claims priority to Chinese Patent Application No. 201710317490.1, filed on May 5, 2017, the disclosures of both of which are hereby incorporated by reference in their entireties.

TECHNICAL FIELD

The present application relates to the field of wireless communications technologies, and particularly to a method for transmitting system information and related devices.

BACKGROUND

A system information mechanism of the radio access technology of the fifth generation (5G) mobile communication technology is an important issue in the 5G new radio (NR) protocol. A user equipment (UE) in an idle state may request a base station to broadcast corresponding system information by indicating requirement for its own services or the system information through a random access channel (RACH). In a phase of system information (SI) of the 5G NR, the $3^{rd}$ generation partnership project (3GPP) has agreed with that the SI of the 5G NR includes minimum SI and other SI. The minimum SI needs to be broadcast periodically, the other SI can be broadcast as required, and the UE acquires the SI through a radio resource control (RRC) dedicated signaling.

Unlike the long term evolution (LTE) system, the system information in the 5G NR is acquired on demand. Each UE may send a request for the system information from the base station through a random access channel (RACH), a media access control (MAC) control element (CE), or a RRC signaling, and the base station broadcasts the system information after receiving the request. In addition to the minimum SI, a system information block (SIB) in other SI may be different in each period. If scheduling information is still used to indicate whether an SIB exists by a method using in the LTE, the terminal has to repeatedly read the scheduling information. Due to a larger number of bits of the scheduling information, the overhead and power consumption of acquiring the system information by the terminal are increased.

SUMMARY

A method for transmitting system information and related devices are provided according to embodiments of the present disclosure. The problem of the overhead and power consumption of a terminal to acquire system information in the related art can be solved.

According to a first aspect of the present disclosure, a method for transmitting system information is provided. The method includes the following.

A base station receives a system information request sent by a terminal.

The base station sends the system information to the terminal according to the system information request. The system information includes minimum system information and other system information, and the minimum system information includes a bitmap field for indicating a system information block existing in the other system information.

According to a second aspect of the present disclosure, a method for transmitting system information is provided. The method includes the following.

A terminal sends a system information request to a base station.

The terminal receives the system information sent by the base station. The system information includes minimum system information and other system information, and the minimum system information includes a bitmap field for indicating a system information block existing in the other system information.

According to a third aspect of the present disclosure, a base station is provided. The base station includes at least one processor and a computer readable storage coupled with the at least one processor and storing at least one computer executable instruction therein which, when executed by the at least one processor, causes the at least one processor to receive a system information request sent by a terminal, and to send system information to the terminal according to the system information request. The system information includes minimum system information and other system information, and the minimum system information includes a bitmap field for indicating a system information block existing in the other system information.

According to a fourth aspect of the present disclosure, a base station is provided. The base station includes at least one processor and a computer readable storage coupled with the at least one processor and storing at least one computer executable instruction therein which, when executed by the at least one processor, causes the at least one processor to send a system information request to a base station, and to receive system information sent by the base station. The system information includes minimum system information and other system information, and the minimum system information includes a bitmap field for indicating a system information block existing in the other system information.

In the embodiments of the present disclosure, the base station first receives the system information request sent by the terminal, and then sends the system information to the terminal according to the system information request. The system information includes the minimum system information and the other system information, and the minimum system information includes the bitmap field for indicating the system information block existing in the other system information. In this way, the terminal does not need to repeatedly interpret scheduling information, only needs to repeatedly interpret the bitmap field instead. Since the number of bits of the bitmap field is minimal, the overhead and power consumption of the terminal to acquire the system information are reduced.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description illustrate some embodiments of the present disclosure. Those of ordinary skill in the art may also obtain other drawings based on these accompanying drawings without creative efforts.

DETAILED DESCRIPTION

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

Figure 1:
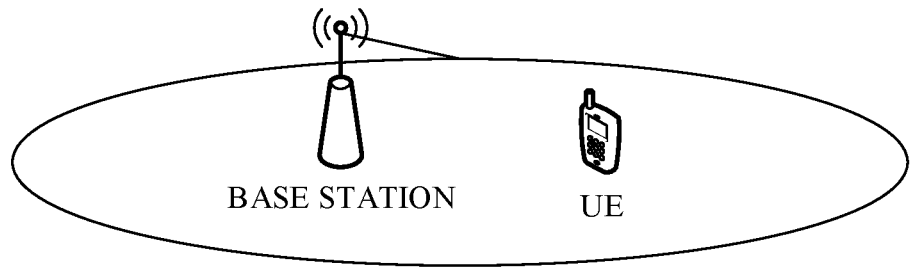
FIG. 1 is a schematic diagram of architecture of a system for transmitting system information according to an embodiment of the present disclosure.

FIG. 1 is a schematic diagram of architecture of a system for transmitting system information according to an embodiment of the present disclosure. The system for transmitting system information includes a terminal and a base station. The terminal may refer to a device that provides voice and/or data connection to a user, or it may be coupled to a computing device such as a laptop or desktop computer, or it may be a standalone device such as a personal digital assistant (PDA). The terminal may also be referred to as a system, a subscriber unit, a subscriber station, a mobile station, a station, a remote station, an access point, a remote terminal, an access terminal, a user terminal, a user agent, or a user device. The base station may be an access point, a NodeB, an evolve NodeB (eNB), or a 5G base station (gNB), and refers to a device in an access network that communicates with a wireless terminal over an air interface through one or more sectors. The base station can serve as a router between the wireless terminal and the rest in the access network by converting a received air interface frame to IP packets, and the access network can include an internet protocol network. The base station can also coordinate the management of attributes of the air interface.

In a first aspect, a method for transmitting system information is provided. The method includes the following.

A base station receives a system information request sent by a terminal.

The base station sends the system information to the terminal according to the system information request. The system information includes minimum system information and other system information, and the minimum system information includes a bitmap field for indicating a system information block existing in the other system information.

As an implementation, the terminal is a terminal in an active state. The base station receives the system information request sent by the terminal as follows.

The base station receives the system information request sent by the terminal in the active state through a radio resource control message.

As an implementation, the system information request includes a broadcast transmission mode.

The base station sends the system information to the terminal according to the system information request as follows.

The base station sends the system information to the terminal in the active state in the broadcast transmission mode according to the system information request.

As an implementation, the method further includes the following after receiving, by the base station, the system information request sent by the terminal in the active state through the radio resource control message.

The base station determines a number of terminals that send the system information request.

The base station determines a transmission mode for sending the system information to the terminals according to the number of the terminals.

As an implementation, the base station determines the transmission mode for sending the system information to the terminals according to the number of the terminals as follows.

When the number of the terminals is greater than a preset threshold, determine to send the system information to the terminals in a broadcast transmission mode.

When the number of the terminals is not greater than the preset threshold, determine to send the system information to the terminals through a radio resource control dedicated signaling.

In a second aspect, a method for transmitting system information is provided. The method includes the following.

A terminal sends a system information request to a base station.

The terminal receives the system information sent by the base station. The system information includes minimum system information and other system information, and the minimum system information includes a bitmap field for indicating a system information block existing in the other system information.

As an implementation, the terminal is a terminal in an active state. The terminal sends the system information request to the base station as follows.

The terminal sends the system information request to the base station through a radio resource control message.

As an implementation, the terminal receives the system information sent by the base station as follows.

The terminal reads the bitmap field.

The terminal acquires the system information block existing in the other system information according to the bitmap field.

As an implementation, the system information request includes a broadcast transmission mode.

The terminal receives the system information sent by the base station as follows.

The terminal receives the system information sent by the base station in the broadcast transmission mode.

In a third aspect, a base station is provided. The base station includes at least one processor and a computer readable storage coupled with the at least one processor and storing at least one computer executable instruction therein which, when executed by the at least one processor, causes the at least one processor to receive a system information request sent by a terminal, and to send system information to the terminal according to the system information request. The system information includes minimum system information and other system information, and the minimum system information includes a bitmap field for indicating a system information block existing in the other system information.

As an implementation, the terminal is a terminal in an active state and the at least one processor is configured to receive the system information request sent by the terminal in the active state through a radio resource control message.

As an implementation, the system information request includes a broadcast transmission mode. The at least one processor is configured to send the system information to the terminal in the active state in the broadcast transmission mode according to the system information request.

As an implementation, the least one processor is further configured to determine a number of terminals that send the system information request, and to determine a transmission mode for sending the system information to the terminal according to the number of the terminals.

As an implementation, the least one processor is further configured to determine to send the system information to the terminals in a broadcast transmission mode when the number of the terminals is greater than a preset threshold, and to determine to send the system information to the terminals through a radio resource control dedicated signaling when the number of the terminals is not greater than the preset threshold.

In a fourth aspect, a base station is provided. The base station includes at least one processor and a computer readable storage coupled with the at least one processor and storing at least one computer executable instruction therein which, when executed by the at least one processor, causes the at least one processor to send a system information request to a base station, and to receive system information sent by the base station. The system information includes minimum system information and other system information, and the minimum system information includes a bitmap field for indicating a system information block existing in the other system information.

As an implementation, the at least one processor is configured to send the system information request to the base station through a radio resource control message.

As an implementation, the at least one processor is further configured to read the bitmap field and to acquire the system information block existing in the other system information according to the bitmap field.

As an implementation, the system information request includes a broadcast transmission mode. The at least one processor is configured to receive the system information sent by the base station in the broadcast transmission mode.

Figure 2:
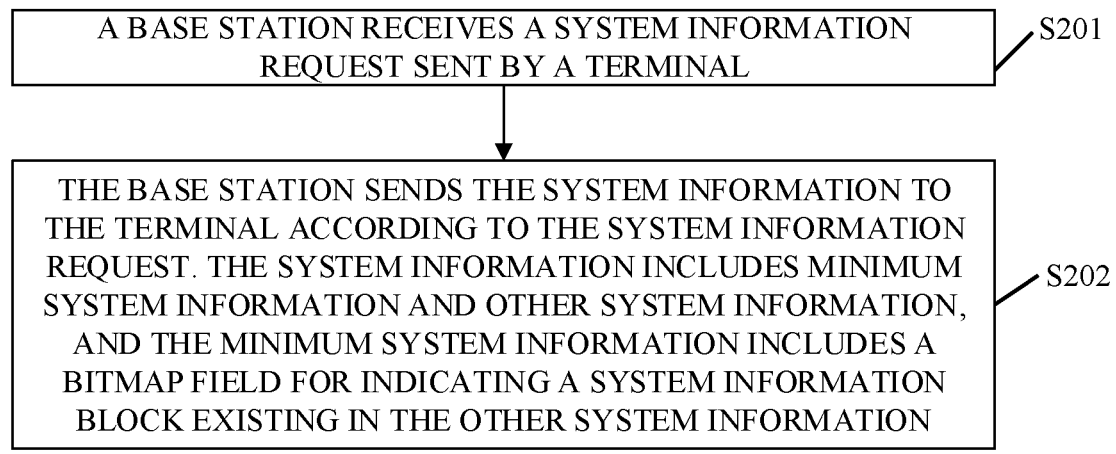
FIG. 2 is a schematic flow chart illustrating a method for transmitting system information according to an embodiment of the present disclosure.

FIG. 2 is a schematic flow chart illustrating a method for transmitting system information according to an embodiment of the present disclosure. As illustrated in FIG. 2, the method in this embodiment begins with operations at block 201.

At block 201, a base station receives a system information request sent by a terminal.

In an implementation, the base station may receive the system information request sent by the terminal through a radio resource control (RRC) message. Alternatively, the base station receives the system information request sent by the terminal through a random access channel (RACH) or a media access control (MAC) control element (CE). The terminal may be a terminal in an active state or a terminal in an idle state.

At block 202, the base station sends the system information to the terminal according to the system information request. The system information includes minimum system information and other system information, and the minimum system information includes a bitmap field for indicating a system information block existing in the other system information.

In an implementation, the base station sends the system information to the terminal in the active state in a broadcast transmission mode according to the system information request.

It is to be noted that, in the current system information solution, the terminal in the idle state may request the base station to broadcast certain system information, and the terminal in the active state requests the base station to transmit the system information through a dedicated signaling. However, if a large number of terminals in the active state can only transmit the system information through the dedicated signaling, the signaling overhead is large. Therefore, the broadcast transmission mode is adopted to reduce the signaling overhead.

As an embodiment, the system information request includes a broadcast transmission mode. In an implementation, when the terminal in the active state requests the system information through the RRC message, the base station is requested to broadcast the system information in the broadcast transmission mode. After receiving the request, the base station sends the system information to the terminal in the broadcast transmission mode.

As an embodiment, the base station counts a number of terminals that send the system information request, and determines a transmission mode for sending the system information to the terminals according to the number of the terminals. Furthermore, when the number of the terminals is greater than a preset threshold, determine to send the system information to the terminals in the broadcast transmission mode, and when the number of the terminals is not greater than the preset threshold, determine to send the system information to the terminals through a radio resource control dedicated signaling.

Figure 3:
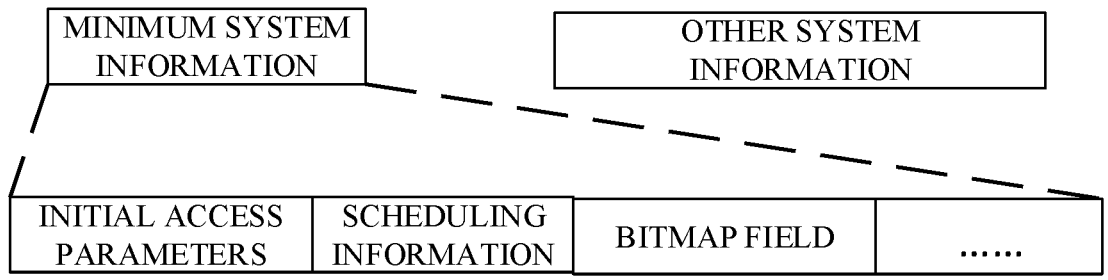
FIG. 3 is a schematic diagram illustrating a structure of system information according to an embodiment of the present disclosure.

FIG. 3 is a schematic diagram illustrating a structure of system information according to an embodiment of the present disclosure. The system information includes minimum system information (SI) and other SI, and the minimum SI includes initial access parameters, scheduling information, and a bitmap field. Scheduling information of all system information blocks (SIBs) is indicated in the minimum SI, however, the scheduling information does not indicate the SIB broadcast by a current base station. A bitmap field (also referred to as a mapping field) is introduced, and the bitmap field is used for indicating that an SIB or a certain SIB in the other SI exists. Therefore, when the terminal receives the SIB in each SI period, it does not need to repeatedly interpret the scheduling information, but only needs to repeatedly interpret the bitmap field. Since the number of bits of the bitmap field is small, the overhead and power consumption of acquiring the other SI by the terminal are reduced.

In the embodiments of the present disclosure, the base station first receives the system information request sent by the terminal, and then sends the system information to the terminal according to the system information request. The system information includes the minimum system information and the other system information, and the minimum system information includes the bitmap field for indicating the system information block existing in the other system information. In this way, the terminal does not need to repeatedly interpret scheduling information, only needs to repeatedly interpret the bitmap field instead. Since the number of bits of the bitmap field is minimal, the overhead and power consumption of the terminal to acquire the system information are reduced.

Figure 4:
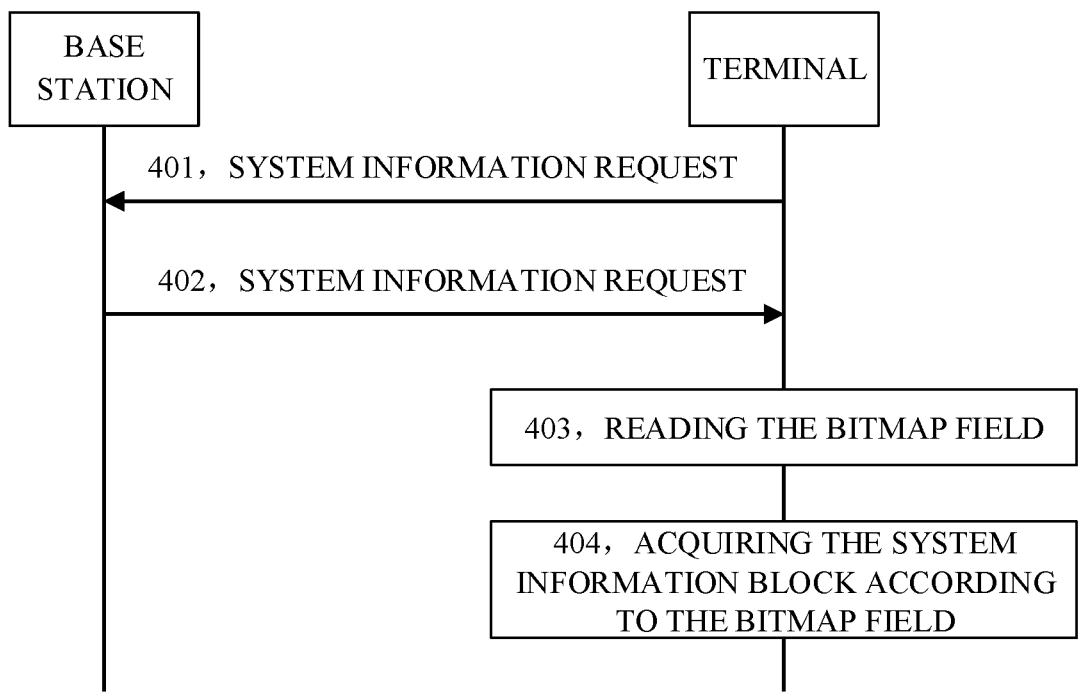
FIG. 4 is a schematic flow chart illustrating a method for transmitting system information according to another embodiment of the present disclosure.

FIG. 4 is a schematic flow chart illustrating a method for transmitting system information according to another embodiment of the present disclosure. As illustrated in FIG. 4, the method in this embodiment begins with operations at block 401.

At block 401, a terminal sends a system information request to a base station.

In an implementation, the terminal sends the system information request to the terminal through a radio resource control (RRC) message. Alternatively, the terminal sends the system information request to the terminal through a random access channel (RACH) or a media access control (MAC) control element (CE). The terminal may be a terminal in an active state or a terminal in an idle state.

At block 402, the base station sends the system information to the terminal according to the system information request. The system information includes minimum system information and other system information, and the minimum system information includes a bitmap field for indicating a system information block existing in the other system information.

In an implementation, the base station sends the system information to the terminal in the active state in a broadcast transmission mode according to the system information request.

It is to be noted that, in the current system information solution, the terminal in the idle state may request the base station to broadcast certain system information, and the terminal in the active state requests the base station to transmit the system information through a dedicated signaling. However, if a large number of terminals in the active state can only transmit the system information through the dedicated signaling, the signaling overhead is large. Therefore, the broadcast transmission mode is adopted to reduce the signaling overhead.

As an embodiment, the system information request includes a broadcast transmission mode. In an implementation, when the terminal in the active state requests the system information through the RRC message, the base station is requested to broadcast the system information in the broadcast transmission mode. After receiving the request, the base station sends the system information to the terminal in the broadcast transmission mode.

As an embodiment, the base station counts a number of terminals that send the system information request, and determines a transmission mode for sending the system information to the terminals according to the number of the terminals. Furthermore, when the number of the terminals is greater than a preset threshold, determine to send the system information to the terminals in the broadcast transmission mode, and when the number of the terminals is not greater than the preset threshold, determine to send the system information to the terminals through a radio resource control dedicated signaling.

At block 403, the terminal reads the bitmap field.

In an implementation, the terminal receives the system information sent by the base station in the broadcast transmission mode. After receiving the system information, the terminal reads the bitmap field from the minimum system information.

At block 404, the terminal acquires the system information block existing in the other system information according to the bitmap field.

In an implementation, as illustrated in FIG. 3, the system information includes the minimum SI and the other SI, and the minimum SI includes initial access parameters, scheduling information, and a bitmap field. Scheduling information of all SIBs is indicated in the minimum SI, however, the scheduling information does not indicate the SIB broadcast by a current base station. A bitmap field (also referred to as a mapping field) is introduced, and the bitmap field is used for indicating that an SIB or a certain SIB in the other SI exists. Therefore, when the terminal receives the SIB in each SI period, it does not need to repeatedly interpret the scheduling information, but only needs to repeatedly interpret the bitmap field. Since the number of bits of the bitmap field is small, the overhead and power consumption of acquiring the other SI by the terminal are reduced.

Figure 5:
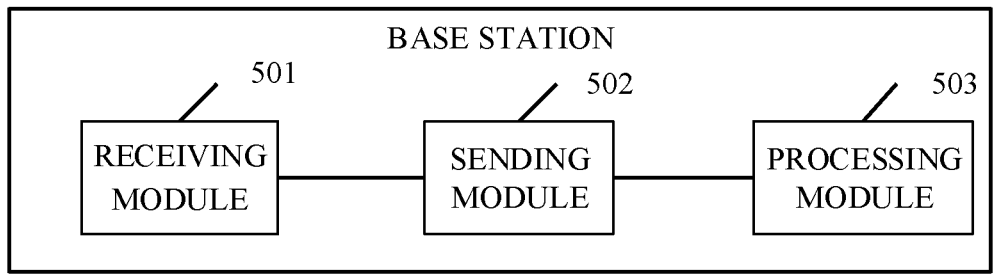
FIG. 5 is a schematic structural diagram illustrating a base station according to an embodiment of the present disclosure.

FIG. 5 is a schematic structural diagram illustrating a base station according to an embodiment of the present disclosure. As illustrated in FIG. 5, the base station in this embodiment includes a receiving module 501 and a sending module 502.

The receiving module 501 is configured to receive a system information request sent by a terminal.

In an implementation, the base station may receive the system information request sent by the terminal through a radio resource control (RRC) message. Alternatively, the base station receives the system information request sent by the terminal through a random access channel (RACH) or a media access control (MAC) control element (CE). The terminal may be a terminal in an active state or a terminal in an idle state.

The sending module 502 is configured to send system information to the terminal according to the system information request. The system information includes minimum system information and other system information, and the minimum system information includes a bitmap field for indicating a system information block existing in the other system information.

In an implementation, the base station sends the system information to the terminal in the active state in a broadcast transmission mode according to the system information request.

It is to be noted that, in the current system information solution, the terminal in the idle state may request the base station to broadcast certain system information, and the terminal in the active state requests the base station to transmit the system information through a dedicated signaling. However, if a large number of terminals in the active state can only transmit the system information through the dedicated signaling, the signaling overhead is large. Therefore, the broadcast transmission mode is adopted to reduce the signaling overhead.

As an embodiment, the system information request includes a broadcast transmission mode. In an implementation, when the terminal in the active state requests the system information through the RRC message, the base station is requested to broadcast the system information in the broadcast transmission mode. After receiving the request, the base station sends the system information to the terminal in the broadcast transmission mode.

As an embodiment, as illustrated in FIG. 5, a device in the embodiment of the present disclosure further includes a processing module 503. The processing module 503 is configured to count a number of terminals that send the system information request, and to determine a transmission mode for sending the system information to the terminal according to the number of the terminals. Furthermore, when the number of the terminals is greater than a preset threshold, determine to send the system information to the terminals in the broadcast transmission mode, and when the number of the terminals is not greater than the preset threshold, determine to send the system information to the terminals through a radio resource control dedicated signaling.

FIG. 3 is a schematic diagram illustrating a structure of system information according to an embodiment of the present disclosure. The system information includes the minimum system information (SI) and the other SI, and the minimum SI includes initial access parameters, scheduling information, and a bitmap field. Scheduling information of all system information blocks (SIBs) is indicated in the minimum SI, however, the scheduling information does not indicate the SIB broadcast by a current base station. A bitmap field (also referred to as a mapping field) is introduced, and the bitmap field is used for indicating that an SIB or a certain SIB in the other SI exists. Therefore, when the terminal receives the SIB in each SI period, it does not need to repeatedly interpret the scheduling information, but only needs to repeatedly interpret the bitmap field. Since the number of bits of the bitmap field is small, the overhead and power consumption of acquiring the other SI by the terminal are reduced.

In the embodiments of the present disclosure, the base station first receives the system information request sent by the terminal, and then sends the system information to the terminal according to the system information request. The system information includes the minimum system information and the other system information, and the minimum system information includes the bitmap field for indicating the system information block existing in the other system information. In this way, the terminal does not need to repeatedly interpret scheduling information, only needs to repeatedly interpret the bitmap field instead. Since the number of bits of the bitmap field is minimal, the overhead and power consumption of the terminal to acquire the system information are reduced.

Figure 6:
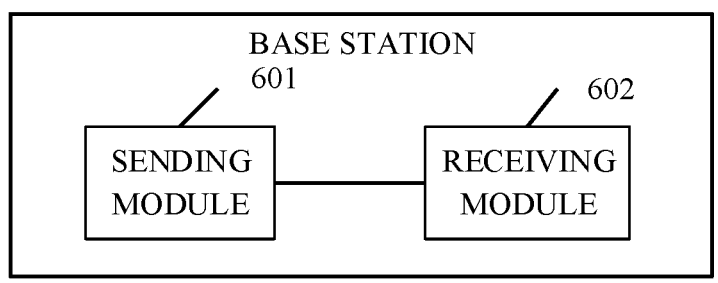
FIG. 6 is a schematic structural diagram illustrating a terminal according to an embodiment of the present disclosure.

FIG. 6 is a schematic structural diagram illustrating a terminal according to an embodiment of the present disclosure. As illustrated in FIG. 6, the terminal in the embodiment of the present disclosure includes a sending module 601 and a receiving module 602.

The sending module 601 is configured to send a system information request to a base station. The system information request includes a broadcast transmission mode.

In an implementation, the terminal sends system information request to the terminal through a radio resource control (RRC) message. Alternatively, the terminal sends the system information request to the terminal through a random access channel (RACH) or a media access control (MAC) control element (CE). The terminal may be a terminal in an active state or a terminal in an idle state.

The receiving module 602 is configured to receive the system information sent by the base station. The system information includes minimum system information and other system information, and the minimum system information includes a bitmap field for indicating a system information block existing in the other system information.

In an implementation, the system information that is sent by the base station in the broadcast transmission mode may be received. After receiving the system information, the mapping field is read. The system information block existing in the other system information is obtained according to the mapping field.

It is to be noted that implementations of each module may also perform the method and function performed by the terminal in the foregoing embodiments in accordance with the corresponding description of the method embodiments illustrated in FIG. 2 and FIG. 4, and are not repeatedly described here.

Figure 7:
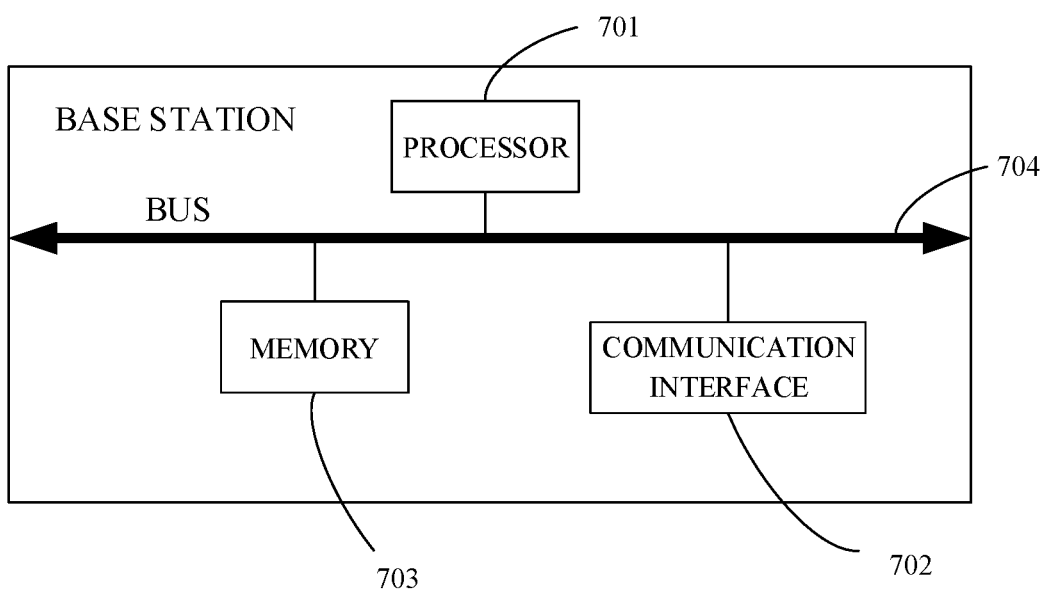
FIG. 7 is a schematic structural diagram illustrating another base station according to an embodiment of the present disclosure.

FIG. 7 is a schematic structural diagram of a base station according to another embodiment of the present disclosure. As illustrated in FIG. 7, the base station can include at least one processor 701 (e.g., a CPU), at least one communication interface 702, at least one memory 703, and at least one bus 704. Among them, the bus 704 is configured to implement connection communication between these components. The communication interface 702 of the base station in this embodiment is a wired transmission port, and may also be a wireless device (e.g., including an antenna device), configured to carry out signaling communication or data communication with other node devices. The memory 703 may be a high-speed RAM memory or a non-volatile memory, such as at least one disk memory. The memory 703 can also optionally be at least one storage device located remotely from the aforementioned processor 701. A set of program codes is stored in the memory 703, and the processor 701 is configured to invoke program codes stored in the memory for carrying out operations as follows.

A system information request sent by a terminal is received.

The system information is sent to the terminal according to the system information request. The system information includes minimum system information and other system information, and the minimum system information includes a bitmap field for indicating a system information block existing in the other system information.

In an implementation, the processor 701 is further configured to carry out operations as follows.

The base station receives the system information request sent by the terminal in the active state through a radio resource control message.

In an implementation, the processor 701 is further configured to carry out operations as follows.

The system information is sent to the terminal according to the system information request as follows.

The system information is sent to the terminal in the active state in the broadcast transmission mode according to the system information request.

In an implementation, the processor 701 is further configured to carry out operations as follows.

The base station determines a number of terminals that send the system information request.

The base station determines a transmission mode for sending the system information to the terminals according to the number of the terminals.

In an implementation, the processor 701 is further configured to carry out operations as follows.

When the number of the terminals is greater than a preset threshold, determine to send the system information to the terminals in the broadcast transmission mode;

When the number of the terminals is not greater than the preset threshold, determine to send the system information to the terminals through a radio resource control dedicated signaling.

It is to be noted that the embodiments of the present disclosure may also be based on a virtual network device implemented by a universal physical server combined with network function virtualization (NFV) technology. The base station may be a virtual machine (VM) configured to run programs for system information transmission, and the VM is deployed on a hardware device (e.g., a physical server). The VM refers to a complete computer system that has a complete system function and operates in a completely isolated environment through software simulation.

It is to be noted that, the embodiments of the present disclosure provide a computer readable storage medium storing instructions, when executed on a computer, causes the computer to execute the methods for transmitting system information of the above aspects.

It is to be noted that the embodiments of the present disclosure provide a computer program product containing instructions, when executed on a computer, causes the computer to execute the methods for transmitting system information of the above aspects.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are preferred embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

Those of ordinary skill in the art may understand that all or part of the steps in the methods described in the foregoing embodiments may be implemented by a program instructing relevant hardware. The program may be stored in a computer-readable storage medium. The storage medium may include a read only memory (ROM), a random access memory (RAM), a magnetic disk, an optical disk, or the like.

The method for transmitting system information and related devices and systems provided by the embodiments of the present disclosure are described in detail above. Specific examples are applied herein to illustrate the principles and implementations of the present disclosure, and the description of the above embodiments is merely for facilitating understanding of the methods and core ideas of the present disclosure. Meanwhile, for those skilled in the art, according to ideas of the present disclosure, there will be changes in the implementations and application scope. In summary, the content of this specification should not be construed as limiting the application.

What is claimed is:

1. A method for transmitting system information, comprising:
   receiving, by a base station, a system information request sent by a terminal; and
   sending, by the base station, the system information to the terminal according to the system information request, wherein the system information comprises minimum system information and other system information, and wherein the minimum system information comprises a bitmap field for indicating a system information block existing in the other system information.

2. The method of claim 1, wherein
   the terminal is in an active state; and
   receiving, by the base station, the system information request sent by the terminal comprises:
   receiving, by the base station, the system information request sent by the terminal in the active state through a radio resource control message.

3. The method of claim 2, wherein
   the system information request comprises a broadcast transmission mode; and
   sending, by the base station, the system information to the terminal according to the system information request comprises:
   sending, by the base station, the system information to the terminal in the active state in the broadcast transmission mode according to the system information request.

4. The method of claim 2, further comprising:
   after receiving, by the base station, the system information request sent by the terminal in the active state through the radio resource control message:
   determining, by the base station, a number of terminals that send the system information request; and
   determining, by the base station, a transmission mode for sending the system information to the terminals according to the number of the terminals.

5. The method of claim 4, wherein determining, by the base station, the transmission mode for sending the system information to the terminals according to the number of the terminals comprises:
   when the number of the terminals is greater than a preset threshold, determining to send the system information to the terminals in a broadcast transmission mode; and
   when the number of the terminals is not greater than the preset threshold, determining to send the system information to the terminals through a radio resource control dedicated signaling.

6. A method for transmitting system information, comprising:
   sending, by a terminal, a system information request to a base station; and
   receiving, by the terminal, the system information sent by the base station, wherein the system information comprises minimum system information and other system information, and wherein the minimum system information comprises a bitmap field for indicating a system information block existing in the other system information.

7. The method of claim 6, wherein
   the terminal is in an active state; and
   sending, by the terminal, the system information request to the base station comprises:
   sending, by the terminal, the system information request to the base station through a radio resource control message.

8. The method of claim 7, wherein
   the system information request comprises a broadcast transmission mode; and
   receiving, by the terminal, the system information sent by the base station comprises:
   receiving, by the terminal, the system information sent by the base station in the broadcast transmission mode.

9. The method of claim 6, wherein receiving, by the terminal, the system information sent by the base station comprises:
   reading, by the terminal, the bitmap field; and
   acquiring, by the terminal, the system information block existing in the other system information according to the bitmap field.

10. The method of claim 9, wherein
    the system information request comprises a broadcast transmission mode; and receiving, by the terminal, the system information sent by the base station comprises:
  receiving, by the terminal, the system information sent by the base station in the broadcast transmission mode.

11. The method of claim 6, wherein
the system information request comprises a broadcast transmission mode; and
receiving, by the terminal, the system information sent by the base station comprises:
receiving, by the terminal, the system information sent by the base station in the broadcast transmission mode.

12. A base station, comprising:
at least one processor; and
a computer readable storage, coupled with the at least one processor and storing at least one computer executable instruction therein which, when executed by the at least one processor, causes the at least one processor to:
  receive a system information request sent by a terminal; and
  send system information to the terminal according to the system information request, wherein the system information comprises minimum system information and other system information, and wherein the minimum system information comprises a bitmap field for indicating a system information block existing in the other system information.

13. The base station of claim 12, wherein the terminal is in an active state and the at least one processor is configured to receive the system information request sent by the terminal in the active state through a radio resource control message.

14. The base station of claim 13, wherein
the system information request comprises a broadcast transmission mode; and
the at least one processor is configured to send the system information to the terminal in the active state in the broadcast transmission mode according to the system information request.

15. The base station of claim 13, wherein the at least one processor is further configured to:
  determine a number of terminals that send the system information request; and
  determine a transmission mode for sending the system information to the terminal according to the number of the terminals.

16. The base station of claim 15, wherein the at least one processor is further configured to:
  when the number of the terminals is greater than a preset threshold, determine to send the system information to the terminals in a broadcast transmission mode; and
  when the number of the terminals is not greater than the preset threshold, determine to send the system information to the terminals through a radio resource control dedicated signaling.

17. A terminal, comprising:
at least one processor; and
a computer readable storage, coupled with the at least one processor and storing at least one computer executable instruction therein which, when executed by the at least one processor, causes the at least one processor to:
  send a system information request to a base station; and
  receive system information sent by the base station, wherein the system information comprises minimum system information and other system information, and wherein the minimum system information comprises a bitmap field for indicating a system information block existing in the other system information.

18. The terminal of claim 17, wherein the at least one processor is configured to send the system information request to the base station through a radio resource control message.

19. The terminal of claim 17, wherein the at least one processor is further configured to read the bitmap field and to acquire the system information block existing in the other system information according to the bitmap field.

20. The terminal of claim 17, wherein
the system information request comprises a broadcast transmission mode; and
the at least one processor is configured to receive the system information sent by the base station in the broadcast transmission mode.

* * * * *